(12) United States Patent
Arsanjani et al.

(10) Patent No.: US 11,368,551 B1
(45) Date of Patent: Jun. 21, 2022

(54) MANAGING COMMUNICATIONS-RELATED DATA BASED ON INTERACTIONS BETWEEN AND AGGREGATED DATA INVOLVING CLIENT-SPECIFIC SERVERS AND DATA-CENTER COMMUNICATIONS SERVERS

(71) Applicant: 8×8, Inc., Campbell, CA (US)

(72) Inventors: Ali Arsanjani, Campbell, CA (US); Bryan R. Martin, Campbell, CA (US); Manu Mukerji, Campbell, CA (US); Venkat Nagaswamy, Campbell, CA (US); Marshall Lincoln, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

(21) Appl. No.: 17/354,061

(22) Filed: Jun. 22, 2021

Related U.S. Application Data (63) Continuation of application No. 16/235,797, filed on Dec. 28, 2018, now Pat. No. 11,044,338.

(51) Int. Cl.
| | | |
|---|---|---|
| *H04L 67/63* | (2022.01) | |
| *G10L 25/54* | (2013.01) | |
| *H04L 41/22* | (2022.01) | |
| *G10L 15/22* | (2006.01) | |

(52) U.S. Cl.
CPC ............ *H04L 67/327* (2013.01); *G10L 15/22* (2013.01); *G10L 25/54* (2013.01); *H04L 41/22* (2013.01)

(58) Field of Classification Search
CPC ....... H04L 67/327; H04L 41/22; G10L 15/22; G10L 25/54

USPC .......................................................... 709/204
See application file for complete search history.

(56) References Cited

U.S. PATENT DOCUMENTS

| | | | |
|---|---|---|---|
| 6,061,433 A | 5/2000 | Polcyn et al. | |
| 7,065,188 B1* | 6/2006 | Mei ........................ | H04M 3/493 379/88.23 |
| 7,369,653 B2* | 5/2008 | Dezonno ................ | H04M 3/493 379/265.01 |
| 7,979,840 B2 | 7/2011 | Zhang et al. | |
| 7,983,401 B1* | 7/2011 | Krinsky ................ | H04M 3/527 379/88.23 |

(Continued)

*Primary Examiner* — David P Zarka
(74) *Attorney, Agent, or Firm* — Crawford Maunu PLLC (57) ABSTRACT

Certain aspects of the disclosure are directed to context aggregation in a data communications network. According to a specific example, process user-data communications between a client station and another station participating in data communications via the data communications services can be processed, where the client station is associated with one of a plurality of client entities configured and arranged to interface with a data communications server providing data communications services. Context information can be aggregated for each respective user-data communication between the client station and the participating station, where the context information corresponds to at least one communications-specific characteristic associated with the user-data communications. In response to receipt of a subsequent user-data communication from the participating station and intended for the client station, present to the participating station a dynamic series of inquiries to address the subsequent user-data communication, based on the aggregated context information.

20 Claims, 5 Drawing Sheets

(56) References Cited

U.S. PATENT DOCUMENTS

| | | |
|---|---|---|
| 8,316,347 B2 | 11/2012 | Arsanjani et al. |
| 8,332,813 B2 | 12/2012 | Arasanjani et al. |
| 8,468,244 B2 | 6/2013 | Redlich |
| 8,739,111 B2 | 5/2014 | Allam et al. |
| 8,750,123 B1 | 6/2014 | Alisaw et al. |
| 8,874,755 B1 | 10/2014 | Deklich et al. |
| 9,077,746 B2 | 7/2015 | Chandrshekhar |
| 9,171,319 B2 | 10/2015 | Qu et al. |
| 9,213,564 B1 | 12/2015 | Klein et al. |
| 9,392,049 B2 | 7/2016 | Ennis et al. |
| 9,542,832 B1 | 1/2017 | Fu et al. |
| 9,552,512 B2 | 1/2017 | Guo et al. |
| 9,717,017 B2 | 7/2017 | Backholm et al. |
| 10,021,590 B2 | 7/2018 | Backholm et al. |
| 10,027,803 B2 | 7/2018 | Krinsky et al. |
| 10,096,063 B2 | 10/2018 | Dahlwadkar |
| 10,282,791 B2 | 5/2019 | O'Neil |
| 10,394,975 B2 | 8/2019 | Kim et al. |
| 10,433,243 B2 | 10/2019 | Lopes et al. |
| 10,573,312 B1 | 2/2020 | Thomson |
| 10,666,799 B2 | 5/2020 | Kazerani et al. |
| 10,944,800 B1 | 3/2021 | Arsanjani et al. |
| 10,949,619 B1 | 3/2021 | Arsanjani et al. |
| 11,025,488 B1 | 6/2021 | Arsanjani et al. |
| 2003/0187868 A1 | 10/2003 | Igarashi |
| 2004/0064517 A1 | 4/2004 | Uenoyama et al. |
| 2004/0122245 A1 | 6/2004 | Franks |
| 2005/0152511 A1 | 7/2005 | Stubley |
| 2008/0027784 A1 | 1/2008 | Ang et al. |
| 2008/0140348 A1 | 6/2008 | Frank |
| 2008/0214219 A1 | 9/2008 | Matsushima |
| 2009/0083768 A1 | 3/2009 | Hatalkar et al. |
| 2009/0254572 A1 | 10/2009 | Redlich et al. |
| 2009/0327172 A1 | 12/2009 | Liu et al. |
| 2010/0250497 A1 | 9/2010 | Redlich et al. |
| 2014/0012826 A1 | 1/2014 | Wisman et al. |
| 2014/0064072 A1 | 3/2014 | Ludwig |
| 2014/0064202 A1 | 3/2014 | Norstrom et al. |
| 2014/0120981 A1 | 5/2014 | King et al. |
| 2014/0244652 A1 | 8/2014 | O'Neil |
| 2015/0242513 A1 | 8/2015 | Sanghavi et al. |
| 2015/0243155 A1 | 8/2015 | Xiong et al. |
| 2015/0294377 A1 | 10/2015 | Chow |
| 2015/0363563 A1 | 12/2015 | Hallwachs |
| 2016/0036869 A1 | 2/2016 | Logan et al. |
| 2016/0080428 A1 | 3/2016 | Fan et al. |
| 2016/0188960 A1 | 6/2016 | Guo et al. |
| 2016/0227431 A1 | 8/2016 | Alisaw |
| 2016/0350674 A1 | 12/2016 | Midboe |
| 2016/0360039 A1 | 12/2016 | Sanghavi et al. |
| 2016/0364488 A1 | 12/2016 | Shen et al. |
| 2017/0104876 A1 | 4/2017 | Hibbard et al. |
| 2017/0236148 A1 | 8/2017 | James et al. |
| 2017/0257303 A1 | 9/2017 | Boyapalle et al. |
| 2017/0262164 A1 | 9/2017 | Jain et al. |
| 2018/0032576 A1 | 2/2018 | Romero |
| 2018/0041378 A1 | 2/2018 | Yan et al. |
| 2018/0047072 A1 | 2/2018 | Chow |
| 2018/0054524 A1 | 2/2018 | Dahan et al. |
| 2018/0176281 A1 | 6/2018 | Arunachalam et al. |
| 2018/0184140 A1 | 6/2018 | Danker et al. |
| 2018/0184171 A1 | 6/2018 | Danker et al. |
| 2018/0309708 A1 | 10/2018 | Potvin |
| 2018/0324041 A1 | 11/2018 | Deklich et al. |
| 2019/0012251 A1 | 1/2019 | Khosrowpour et al. |
| 2019/0042988 A1 | 2/2019 | Brown et al. |
| 2019/0243836 A1 | 8/2019 | Nanda et al. |
| 2019/0253520 A1 | 8/2019 | Maharana et al. |
| 2019/0327130 A1 | 10/2019 | Huang et al. |
| 2019/0342718 A1 | 11/2019 | Pylappan et al. |
| 2019/0349426 A1 | 11/2019 | Smith et al. |
| 2020/0092293 A1 | 3/2020 | Liu et al. |
| 2020/0133629 A1 | 4/2020 | Pratt et al. |

\* cited by examiner

MANAGING COMMUNICATIONS-RELATED DATA BASED ON INTERACTIONS BETWEEN AND AGGREGATED DATA INVOLVING CLIENT-SPECIFIC SERVERS AND DATA-CENTER COMMUNICATIONS SERVERS

OVERVIEW

Aspects of various embodiments are directed to attempting to unpack and interpret massive amounts of information in data communications. Particular embodiments are directed toward methods for use in verbal and typed communications systems employing a data communications server operated by a communications provider, where the data communications server is on the data communications provider side, to provide data communications services to a multitude of client entities. A data communications endpoint device can use a broadband Internet connection to connect to a data communications server that is managed by a data communications service provider. The data communications server can handle communication routing and provide other data communications services for the data communications endpoint device. Such server(s) operating on behalf of data-communications service providers, provide users access to managed databases and/or services over the high throughput mediums. Non-limiting examples of data-communications service providers include ISPs (Internet Service Providers) and various other companies which provide Internet-related services such as email and search-engine services and more specialized computer-based services such as staffing software service, information technology management service, and/or customer relationship management services.

Computing servers are increasingly being used to provide various data communications services over a network including, but not limited to, routing of Voice over Internet Protocol (VoIP) communications and/or more generally, for providing data communications services such as messaging, video conferencing, management of data communications exchange servers, packet switching, traffic management, website hosting, remote data storage, remote computing services, and management of virtual computing environments, among other examples.

SUMMARY

Various example embodiments are directed to issues such as those addressed above and/or others which may become apparent from the following disclosure concerning systems and methods for context aggregation in a data communications network.

Certain of these example embodiments are directed to an apparatus comprising a management circuit configured and arranged to correlate communications-specific characteristics of user-data communications involving at least one client entity among a plurality of remotely-situated client entities with a particular context, the user-data communications being facilitated by a plurality of disparate Internet-communicative data communications systems, and a data-center communications server. In such example embodiments, the data-center communications server is configured and arranged to process user-data communications between a client station and another station participating in data communications via the data communications services, where the client station is associated with one of the client entities. Context information for each respective user-data communication between the client station and the participating station can be aggregated by the data-center communications server. In such exemplary embodiments, the context information can correspond to at least one communications-specific characteristic associated with the user-data communications. In response to receipt of a subsequent user-data communication from the participating station intended for the client station, the data-center communications server can present to the participating station a dynamic series of inquiries to address the subsequent user-data communication, based on the aggregated context information.

In accordance with other related aspects of the present disclosure, the context of various data communications in a data communications network are aggregated. User-data communications between a client entity and another party are retrieved from a plurality of interconnected data communications systems. The client entity may be one of a plurality of remotely-situated client entities, each respectively subscribing to and receiving data communications services from a data communications server. To determine the context of the relationship (e.g., the communications) between the client entity and the other party, a management circuit can be configured and arranged to correlate communications-specific characteristics of user-data communications involving at least one client entity among a plurality of remotely-situated client entities with a particular context, where the user-data communications are facilitated by a plurality of disparate Internet-communicative data communications systems.

Certain of these example embodiments are directed toward methods for use in communications systems employing a data communications server operated by a communications provider, where the data communications server is on the data communications provider side, to provide data communications services to a multitude of client entities. In such systems, the data-center communications server includes one or more computer processor circuits (configured with access to databases stored in memory circuits) and configured to act as a communications-control engine for routing, processing communications and/or providing related communications services on behalf of client entities. Such client entities may be exemplified as businesses with employees ranging in number from just a few to thousands, and being located/mobile for communications services in any of a multitude of venues.

According to other specific aspects, users of a server-based communications system use a plurality of communication services to communicate with clients and other professionals to carry out various tasks. For example, users may use a private network application to generate work products, a cloud-based application to manage service issues, another cloud-based application to manage direct communications such as email and chat messages, and yet another cloud-based application to manage financial matters such as billing and invoicing. In many instances, it may be beneficial for users of the server-based system to compile a list of recent interactions with a client and/or other professional to improve subsequent interactions with the client or professional.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are applicable to a variety of different types of apparatuses, systems and methods involving intelligent interactions in a data communications network serving disparate businesses or client entities. In certain implementations, aspects of the present disclosure have been shown to be beneficial when used in the context of providing data communications services. While the present disclosure is not necessarily limited to such data communications systems as described herein, for purposes of facilitating understanding and appreciation of certain embodiments, the following discussion uses such data communications-based services and systems in the context and on behalf of communications platforms of client entities which subscribe to such services from a data communications service provider (with a server).

Example embodiments are directed toward methods for use in communications systems employing a data communications server operated by a communications provider, where the data communications server is on the data communications provider side, to provide data communications services to a multitude of client entities. For instance, the data communications server can provide data communications sessions involving a client-specific endpoint device and another participating endpoint device, where the client-specific endpoint device is associated with a client-entity among the plurality of remotely-situated client entities. In such contexts, the data communications server may be referred to as a data-center communications server. In such systems, the data-center communications server includes one or more computer processor circuits (configured with access to databases stored in memory circuits) and configured to act as a communications-control engine for routing, processing communications and/or providing related communications services on behalf of client entities. Such client entities may be exemplified as businesses with employees ranging in number from just a few to thousands, and being located for communications services in any of a multitude of venues. Each such data communications session can include transmission and receipt of data communications between at least two endpoint devices, as hosted (e.g., provided) by the data communications server.

Accordingly, example embodiments of the present disclosure are directed to techniques for using machine learning-based algorithms for context aggregation in a data communications network. This machine learning-based data communications routing system can provide a proactive monitoring system to rapidly assess the content, classification, severity, sentiment and/or topic of data communications to create predictive models for received data communications. Certain proactive monitoring embodiments of the present disclosure collect information about previous data communications between a client entity and another party (e.g., individual and/or organization), and determine the context of each of the previous data communications. Such contexts can be representative of a sentiment between the client entity and the party, and/or the health of the relationship between the client entity and the party. By correlating aspects of the data communication, such as key words, phrases, tone, and/or other recognizable features and correlating such features with the overall context of the data communication, a dynamic series of inquiries can be generated to address subsequent user-data communications between the parties. The dynamic series of inquiries can be presented by an interactive voice recognition (IVR) system, by a chatbot, by a text-based communication system, among others, and can be based on the aggregated context information.

Particularly, embodiments of the present disclosure are directed to techniques for context aggregation in a data communications network. User-data communications between a client entity and another party can be retrieved from a plurality of interconnected data communications systems. In such embodiments, the client entity can be one of a plurality of remotely-situated client entities each respectively subscribing to and receiving data communications services from a data communications server. The user-data communications can include various data communications services over a network including, but not limited to, routing of VoIP communications and/or for providing communications services such as: messaging, video conferencing, management of data communications exchange servers, packet switching, traffic management, website hosting, remote data storage, remote computing services, and management of virtual computing environments, among other examples. To determine the context of the relationship (e.g., the communications) between the client entity and the other party, machine learning and/or artificial intelligence can be implemented, such that with added use, thresholds for determining the context of the relationship become more defined with a larger data set.

As an illustration, a data communications server can enable and facilitate each of a plurality of user-based data communications sessions, in which each data communications session involves a client-specific endpoint and another participating endpoint. The client-specific endpoint can be associated with a client entity (e.g., client station such as CPU connected/enabled for communications over the Internet) among a plurality of remotely-situated client entities each respectively configured and arranged to interface with the data communications server. The other participating endpoint can be associated with a participating entity (e.g., participating station) external to the client entity and configured and arranged to interface with the data communications server. A management circuit can be configured and arranged to correlate communications-specific characteristics of user-data communications involving at least one of the client entities with a particular context. Moreover, in such exemplary embodiments, a data-center communications server can be configured and arranged to process user-data communications between a client station and another station participating in data communications via the data communications services, where the client station is associated with one of the client entities. The data-center communications server can aggregate context information for the user-data communications between the client station and the participating station, where the context information corresponds to at least one communications-specific characteristic associated with the user-data communications. In response to receipt of a subsequent user-data communication from the participating station, the user-data communication intended for the client station, the data-center communications server can present to the participating station a dynamic series of inquiries to address the subsequent user-data communication, based on the aggregated context information.

Each of the user-data communications retrieved corresponds with some form of communication between the client entity and a particular party, and each user-data communication retrieved can be retrieved from a data communications system providing at least one data communications service to the client entity. For instance, a client entity ABC company may have an email service, a chat service, a VoIP service, and a customer relationship management (CRM) service, each of which are provided by the data communications provider. One data communications system can manage the email service, another data communications system can manage the chat service, a different data communications system can manage the VoIP service, and yet another data communications system can manage the CRM service. Examples are not limited to the above mentioned data communications services/systems. In various example embodiments, each of the plurality of interconnected data communications systems can be a CRM system, an email communication system, a product sales system, a text-based communications system, a voice-based communications system, a technological support system, a data monitoring system, and/or external data sources associated with at least one of the client entity and the other party, among others.

To determine the context between ABC Company and Client A, communications between ABC Company and Client A can be retrieved from each of these data communications systems. A context for each communication between ABC Company and Client A can be determined. For instance, a keyword, a phrase, and/or a tone can be identified for each respective user-data communication between the client entity and the other party during this time period, and the context for each respective user-data communication can be determined based on the identified keyword, phrase, and/or tone. A database of relationships between keyword, phrase, tone, topic, etc. and context can be maintained, such that a context can be determined for subsequent communications.

In various example embodiments, the data-center communications server can be configured and arranged to present the dynamic series of inquiries to the participating station as part of a virtual assistant displayed on a graphical user interface of the participating station or as a voice prompt provided to the participating station, based on a type of the subsequent user-data communication. The data-center communications server can be configured and arranged to detect a type (e.g., format) of the subsequent user-data communication, and present the virtual assistant in a same type of communication. For instance, the data-center communications server can detect that subsequent user-data communication is in the form of a voice call, and the data-center communications server can, in response, present the virtual assistant in a voice format. As another illustration, the data-center communications server can detect that the data-communications between the client station and the participating station are in chat form, and in response, present the dynamic series of inquiries in chat form. As another illustration, the data-center communications server can detect that the data-communications between the client station and the participating station are in voice form, and in response, present the dynamic series of inquiries be presented using an IVR system. In various example embodiments, the data-center communications server can detect a type of user-data communication which a particular user typically uses at a particular time, day, and/or in a particular location, and present the dynamic series of inquiries in the associated format. For instance, if the participating station is known to the data-center communications server, and a user associated with that particular participating station is known by the data-center communications server to use chat-based communications (e.g., text messaging, instant messaging, among others) the data-center communications server can present the dynamic series of inquiries to the participating station in a chat-based format. Additionally and/or alternatively, the data-center communications server can present the dynamic series of inquiries to the participating station in multiple formats, such as by voice and also in text (e.g., by chatbot, text message, etc.).

In additional example embodiments, the data-center communications server can be configured and arranged to provide to each respective client station an option to configure the virtual assistant and specify different sets of inquiries to be presented to the participating station in response to the context for the subsequent user-data communication meeting predefined client-specific criteria. Additionally and/or alternatively, the data-center communications server can be configured and arranged to terminate the subsequent user-data communication in response to an indication that the subsequent user-data communication was addressed using the virtual assistant. For instance, if the purpose of the user-data communication (e.g., via chatbot or by voice) was to determine the hours of operation for the client entity, and such hours were provided by the dynamic series of inquiries, then the user-data communication can be terminated responsive to an indication from the other party (e.g., the individual and/or organization generating the chatbot message and/or originating the voice call) that the purpose of the user-data communication was addressed by the dynamic series of inquiries.

In further example embodiments, the data-center communications server is configured and arranged to identify a topic associated with the subsequent user-data communication and modify the dynamic series of inquiries based on the identified topic and the aggregated context information. For instance, an automated voice and/or text-based communication system may communicate on behalf of the client entity in response to receipt of a user-data communication from a participating entity (e.g., a customer of the client entity). The automated voice and/or text-based communication system can present a series of inquiries to the communicating party, and determine a topic of the user-data communication. For instance, the automated voice and/or text-based communication system can determine that the user-data communication relates to a product issue, or a technical issue. As the issue/topic is identified, the dynamic series of inquiries can be further modified to address the issue/topic without connecting the user-data communication to a live agent of the client entity, and/or to gather additional information such that the live agent has further information once connected.

Additionally and/or alternatively, the data-center communications server can be configured and arranged to identify an industry associated with the subsequent user-data communication and modify the dynamic series of inquiries based on the identified industry and the aggregated context information. For instance, the automated voice and/or text-based communication system may communicate on behalf of the client entity in response to receipt of a user-data communication from a participating entity (e.g., a customer of the client entity). The automated voice and/or text-based communication system can present a series of inquiries to the communicating party, and determine an industry associated with the subsequent user-data communication. For instance, the automated voice and/or text-based communication system can determine that the user-data communication relates to the automotive industry and present a first set of inquiries, and/or determine that the user-data communication relates to the haircare industry and present a second set of inquiries. Moreover, the data-center communications server can be configured and arranged to identify an industry associated with the participating station and modify the dynamic series of inquiries based on the identified industry and the aggregated context information. For instance, the automated voice and/or text-based communication system can determine that the user-data communication originated from a participating station that is associated with the automotive industry and present a first set of inquiries, and/or determine that the user-data communication originated from a participating station that is associated with the haircare industry and present a second set of inquiries.

While examples herein are described with regards to analyzing speech characteristic parameters, it is noted that the user-data communications can correspond to user-generated audible messages or non-voice user-generated messages. For instance, user-generated audible messages can include voicemails and VoIP calls, and non-voice user-generated messages can include email messages, text messages, and/or chat messages, among others.

In a further example embodiment, the data-center communications server is configured and arranged to identify an industry associated with the subsequent user-data communication and to route the user-data communication to a particular branch or extension of the client station based on the identified industry and the aggregated context information. For instance, a particular client entity may have different branch offices associated with different industries (e.g., one for adhesives, and one for home goods), and different levels of service experts within each branch office. In response to identifying, via the dynamic series of inquiries and answers presented thereto, the industry relevant to the subsequent user-data communication and the aggregated context between the client entity and the other party, the data-center communications server can modify and/or adjust the dynamic series of inquiries to address the communication received, gather additional information, and/or route the communication to an appropriate representative of the client entity. Additionally and/or alternatively, the data-center communications server can be configured and arranged to identify an industry associated with the participating station and route the user-data communication to a particular branch or extension of the client entity based on the identified industry and the aggregated context information. For instance, the participating station (e.g., the customer contacting the client entity via the user-data communication) can be associated with a particular industry, and based on the industry of the participating station, as well as the context information between the participating station (e.g., the customer) and the client entity, the user-data communication can be routed or otherwise handled.

In yet further example embodiments, the data-center communications server can be configured and arranged to identify a topic associated with the subsequent user-data communication and to route the user-data communication to a particular branch or extension of the client entity based on the identified topic and the aggregated context information. Similarly, the data-center communications server can be configured and arranged to identify an industry and a topic associated with the subsequent user-data communication, and to route the user-data communication to a particular branch or extension of the client entity based on the identified industry, the identified topic, and the aggregated context information.

In various example embodiments, the management circuit can be configured and arranged to maintain a client-specific database that correlates keywords or tones identified in user-data communications with at least one issue or topic. Accordingly, the data-center communications server can be configured and arranged to compare a keyword or a tone identified from the subsequent user-data communication with information stored in the client-specific database, and generate the dynamic series of inquiries based on the comparison and the aggregated context information.

In various example embodiments, the data-center communications server can be configured and arranged to present the dynamic series of inquiries to the participating station as part of a virtual assistant session. As used herein, a virtual assistant session refers to or includes the dynamic series of inquiries provided to, and associated responses received from, a sender of a user-data communication (such as a customer of a client entity). During the virtual assistant session, a dynamic series of inquiries may be presented to address the user-data communication. The dynamic series of inquiries may be modified based on responses received during the virtual assistant session, to identify an issue or topic associated with the user-data communication. The user-data communication may be terminated, and the user-data communication may be removed from the queue, in response to an indication that the user-data communication was addressed during the virtual assistant session. Additionally and/or alternatively, the user-data communication may be routed via the data-center communications server, in response to an indication that the user-data communication was not addressed during the virtual assistant session. The data-center communications server can further route the subsequent user-data communication to a representative of the client entity based on the aggregated context information and in response to an indication that the user-data communication was not addressed by the virtual assistant. In various example embodiments, the data-center communications server can be configured and arranged to generate a transcript of the dynamic series of inquiries and responses provided by the virtual assistant, and to provide the transcript from the virtual assistant to the representative in response to the routing.

In a further exemplary embodiment, a management circuit can be configured and arranged to correlate communications-specific characteristics of user-data communications involving at least one client station among a plurality of remotely-situated client stations with a particular context. A client-specific communications server, communicatively coupled to the management circuit, can be configured and arranged to route data communications for a plurality of client-specific endpoint devices associated with a client station. In such embodiments, the client station can be configured and arranged to interface with a data-center communications server providing data communications services to the client station, for instance, on a subscription basis.

In various example embodiments, the client-specific communications server can be configured and arranged to provide user-data communications sessions involving at least one of the client-specific endpoint devices and another participating endpoint device. The other participating endpoint device, being associated with a participating station external to the client station, can be configured and arranged to interface with the data-center communications server. As described herein, the client-specific communications server can be configured and arranged to retrieve from a plurality of disparate interconnected data communications systems, information relating to user-data communications between the client station and the participating station. The client-specific communications server can aggregate context information for each respective user-data communication between the client station and the participating station, where the context corresponds to at least one communications-specific characteristic. In response to receipt of a subsequent user-data communication from the participating station, the client-specific communications server can present to the participating station a dynamic series of inquiries to address the subsequent user-data communication, based on the aggregated context information.

Consistent with various example embodiments, and as discussed herein, the client-specific communications server can be configured and arranged to identify a topic associated with the subsequent user-data communication, and to provide instructions to the data-center communications server to modify the dynamic series of inquiries based on the identified topic and the aggregated context information. In additional example embodiments, the client-specific communications server can be configured and arranged to identify an industry associated with the subsequent user-data communication and provide instructions to the data-center communications server to modify the dynamic series of inquiries based on the identified industry and the aggregated context information.

Additionally and/or alternatively, the client-specific communications server can be configured and arranged to identify an industry associated with the participating station and provide instructions to the data-center communications server to modify the dynamic series of inquiries based on the identified industry and the aggregated context information. In additional example embodiments, the client-specific communications server is configured and arranged to identify an industry associated with the subsequent user-data communication and provide instructions to the data-center communications server to route the user-data communication to a particular branch or extension of the client station based on the identified industry, the aggregated context information, and satisfaction of particular client-specific criteria.

As discussed herein, the client-specific communications server can be configured and arranged to present the dynamic series of inquiries to the participating station as part of a virtual assistant session displayed on a graphical user interface of the other participating endpoint device and/or a voice prompt provided to the other participating endpoint device. For instance, the dynamic series of inquiries can be presented to the other participating endpoint device, based on a type of the subsequent user-data communication.

The context for user-data communications can be determined by the data-center communications server based on a comparison of the aggregated identifiable aspects and the context information stored in the client-specific database. Subsequently, user-data communications between the client entity and the other party can be handled in a particular manner, and in response to the context for the plurality of user-data communications meeting predefined client-specific criteria. For instance, the data-center communications server can be configured and arranged to communicate to the client entity, instructions to route user-data communications between the client entity and the other party, based at least in part on the determined context for the plurality of user-data communications meeting predefined client-specific criteria.

In various other related embodiments, the criteria for assigning a particular context to a user-data communication and/or user-data communications may be dynamic and based, at least in part, on user feedback. For instance, the identifiable aspects of the user-data communications can include a keyword, a tone, and/or a phrase. The data-center communications server can be configured and arranged to determine a context for aggregated user-data communications involving the client entity, by receiving from an end-user associated with the client entity, feedback indicating an extent to which the determined context is accurate. As an illustration involving such feedback, the user may be asked for feedback regarding whether the keywords, tones, and/or phrases identified accurately capture the sentiment of the user-data communications. Based on the user feedback, the client-specific database for the associated client entity can be updated. Additionally and/or alternatively, the data-center communications server can be configured and arranged to provide to each respective client entity, an option to specify a manner in which a context is assigned to a user-data communication and/or user-data communications. For instance, client entities can specify aspects (e.g., keywords, phrases, topics, tones, etc.) that can be identified from user-data communications directed to the respective client entity, and a context associated each of the identifiable aspects. Similarly, the data-center communications server can be configured and arranged to provide to each respective client entity, an option to specify handling processes for handling user-data communications between the client entity and the other party in response to the context for the plurality of user-data communications meeting predefined client-specific criteria.

At least one machine learning-based algorithm can assist in the effective and efficient context aggregation in a data communications network. For instance, previous communications between parties can be scaled and/or correlated with a particular context. After the completion of a communication, feedback can be obtained from the communicating parties, which assists in the determination of the overall context of the completed communication. Aspects of the completed communication can then be compared to subsequent communications in order to identify the context of the subsequent communications. Subsequent data-communications can be compared against the previous communications to determine a likely context of the new data-communication.

Various processes can be implemented to determine a context for a particular user-data communication. For instance, the context of the aggregated user-data communications can be based on the topic of the user-data communications, a sentiment of the user-data communications, and/or an identification of an individual or organization which originated the user-data communications, among others. In various embodiments, the context of the aggregated user-data communications can be identified based on previous communications and/or previous interactions with a particular customer. The processing resource communicatively coupled to the data-communications server can be configured and arranged to access CRM data, and communications services accessed by the plurality of remotely-situated client entities, the communications services including an email system and a text-based chat system. The context of the voice communication can be identified based on the CRM data, information in the email system, or information in the text-based chat system. Various handling processes can be implemented in response to the context of a particular user-data communication or an aggregate of user-data communications meeting or exceeding a particular threshold.

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to data communications servers configured to provide data communication services for endpoints of a plurality of different client accounts. It is understood that the various examples may be adapted for use with computer servers configured to provide various other remote services, including, but not limited to: website hosting, remote data storage, remote computing services, virtual computing environments, enterprise communications, virtual contact center, and other services.

According to certain embodiments, a data communications system can be configured to allow a client-specific control engine to dynamically modify and control the communication flow and processing at different levels within the system, including (re)routing incoming communications. Rules of varying complexity can be used for routing incoming communications, whether to one or more receptionists, directly to extensions, to voicemail, or for other communication routing purposes. Similarly, rules of varying complexity can be used to control devices associated with particular client entities. The logic used for the control of the networked devices can be based upon directives and related data shared across multiple Private Branch Exchanges (PBXs), data that can be dynamically changed, and upon rules and logic that can be defined according to multiple tiers of communication routing decisions. For example, a large company can have many different offices or store locations. Portions of the communication routing and processing can be shared across the entire company. Other portions could be shared with subsets or groups (e.g., groups based upon geographic regions or countries or based upon different company divisions). Still further portions can be set based upon individuals being called. Such aspects can facilitate the configuration, management, and updating of the data communications system, particularly in situations where there are many thousands of extension rules can be a difficult proposition.

The data communications system described herein provides inbound and outbound communication routing for a data communications system. The data communications system can be configured as a Platform as a Service (PaaS) that provides a user with access to, among other things, telephone communication routing control, PBX functions, computer telephony integration (CTI), and data analytics (in this context the user can refer to, e.g., person, group, server or CPU, or subscribing business entity).

Figure 1:
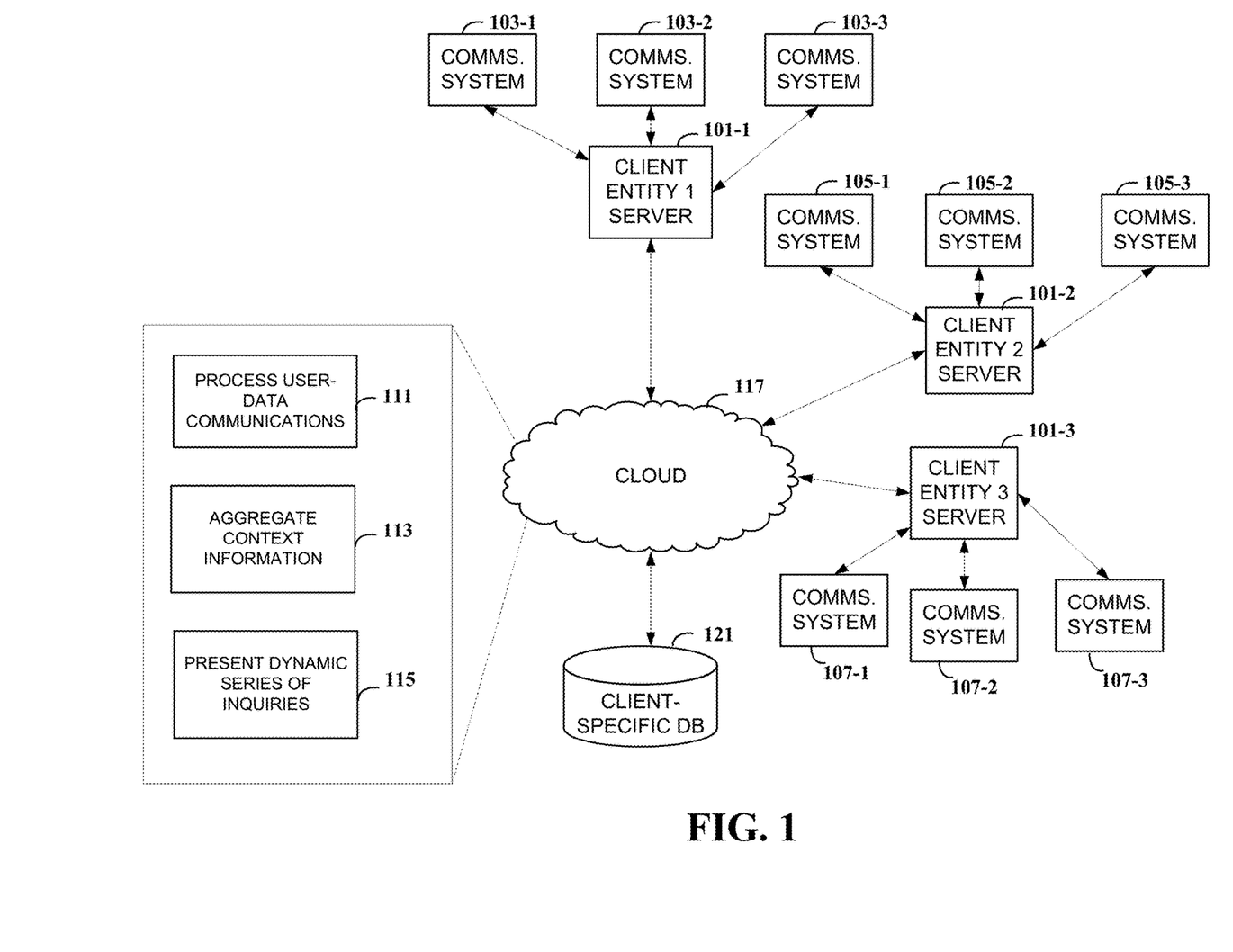
FIG. 1 illustrates a block diagram of an example system for intelligent interactions in a data communications network, consistent with the present disclosure.

Turning now to the figures, FIG. 1 illustrates a block diagram of an example system for context aggregation in a data communications network, consistent with the present disclosure. Data communications services can be provided for a plurality of client entities, such as via a data-center communications server. Each client entity can provide the data communications services to various endpoint devices, as can be implemented in a distributed computing environment. For instance, as illustrated in FIG. 1, a data-center communications server can host via cloud 117. A plurality of client entities can access the data-center communications server via the cloud 117, such as by a respective client entity server (e.g., client entity 1 server 101-1, client entity 2 server 101-2, and client entity 3 server 101-3).

Each of the respective client entities can be connected in one or more data networks as discussed further herein. Moreover, each of the respective client entity servers 101-1, 101-2, and 101-3 can be communicatively coupled to a plurality of communications systems. For example, client entity 1 server 101-1 can be communicatively coupled to communications systems 103-1, 103-2, and 103-3. Similarly, client entity 2 server 101-2 can be communicatively coupled to communications systems 105-1, 105-2, and 105-3. Further, client entity 3 server 101-3 can be communicatively coupled to communications systems 107-1, 107-2, and 107-3.

Although not illustrated in FIG. 1, each of the client entity servers can be communicatively coupled to a number of endpoint devices. The endpoint devices can include data communications-enabled devices (e.g., IP phones, smart phones, tablets, and/or desktop computers with appropriate data communications software applications) and/or non-data communications endpoint devices (e.g., plain old telephone service (POTS) telephones and cellular-capable devices). Each endpoint device is respectively associated with an account of a respective client. Endpoint devices can be associated with a particular client account by registering the endpoint device with a particular client account serviced by the data communications server. Registered devices for each client account can be listed in a respective account settings file (not shown) stored by a data-center communications server.

The system illustrated in FIG. 1 further includes one or more processing circuits configured to implement client-specific control engines, which are configured to adjust the data communications provided for each client account according to a respective set of control directives. For instance, the client-specific control engines can adjust a manner in which endpoint devices are controlled, and/or a manner of routing of data communications for a client account, by accessing client-specific sets of control data stored in at least one client-specific database 121.

The server-based communications system illustrated in FIG. 1 can facilitate determination of a context for aggregated communications, consistent with the present disclosure. In various other related exemplary embodiments (alone and/or building on the above aspects), the context for the aggregated communications can be determined by a data-center communications server. Additionally and/or alternatively, the context for the aggregated communications can be determined by a client managed server. In either situation, at 111, user-data communications between a client station and another station participating in data communications via the data communications services can be processed. The client station, as discussed herein, can be associated with one of the client entities. For instance, if a context between client entity 1 and Client B is to be identified, then user-data communications between client entity 1 and Client B during a first time period can be processed from communications systems 103-1, 103-2, and 103-3. As another illustration, if a context between client entity 2 and Client B is to be identified, then user-data communications between client entity 2 and Client B during the first time period can be retrieved from communications systems 105-1, 105-2, and 105-3.

At 113, context information for each respective user-data communication between the client station and the participating station can be aggregated, where the context information corresponds to at least one communications-specific characteristic associated with the user-data communications. In various example embodiments, the aggregated context can be determined for each respective user-data communication between the client entity and the other party during a specified (e.g., first) time period. The identification of the context of communications during the first time period can assist with the development of the client specific database 121, and enable machine learning to assign a context to subsequent user-data communications. As such, a plurality of user-data communications between the client entity and the other party can be aggregated during a second time period, where the second time period is subsequent the first time period. For instance, once the context for previous user-data communications between client entity 1 and Client B are determined (e.g., during the first time period), then user-data communications between client entity 1 and Client B during the second time period can be retrieved from communications systems 103-1, 103-2, and 103-3.

As an illustration, keywords such as "pleased" and "happy" can be identified from an email from Client B, and the phrase "I would like to place another order" can be identified from a transcript of a voice call from Client B. These identified aspects can be combined (e.g., aggregated) to determine an overall context between Client B and client entity 1. As a further illustration, a tone from a voicemail from Client B to client entity 1 can indicate that Client B was very angry (e.g., the tone of her voice was short and loud), yet keywords from the same voicemail such as "I am very pleased" may be identified. Similarly, product usage records can indicate that Client B has been using her purchased services frequently. Each of these identifiable aspects can be combined (e.g., aggregated) to determine an overall context between Client B and client entity 1.

At 115, in response to receipt of a subsequent user-data communication from the participating station and intended for the client station, a dynamic series of inquiries can be presented to the participating station to address the subsequent user-data communication. As described herein, the dynamic series of inquiries can be generated based on the aggregated context information. As described herein, a context can represent an overall sentiment of a relationship between at least two parties. As an illustration, a context can represent a strength of a relationship between a client that has purchased data-communications services (e.g., ABC Company), and a customer of the client (e.g., Client B). The context can be identified based on a number of factors, including keyword, phrase, and/or tone, and can be identified from a single user-data communication between the parties and/or from an aggregate of user-data communications between the parties. In embodiments where the context is determined from an aggregate of user-data communications, projections and/or predictions can be made as to the likely future context between the parties. The dynamic series of inquiries can be presented (such as by a data-center communications server) to a participating station as part of a virtual assistant displayed on a graphical user interface of the other participating station or a voice prompt provided to the other participating station. As used herein, a graphical user interface (GUI) refers to or includes a graphical display that allows users to interact with electronic devices through graphical icons and visual indicators. Additionally, a graphical user interface format includes icons, windows, help menus, and other features that represent the standard well-known interfaces in modern personal computers (PCs).

The dynamic series of inquiries can include questions and/or prompts that are selected based on the aggregated context between the two parties, and can be presented in a format based on a type of the subsequent user-data communication.

Figure 2:
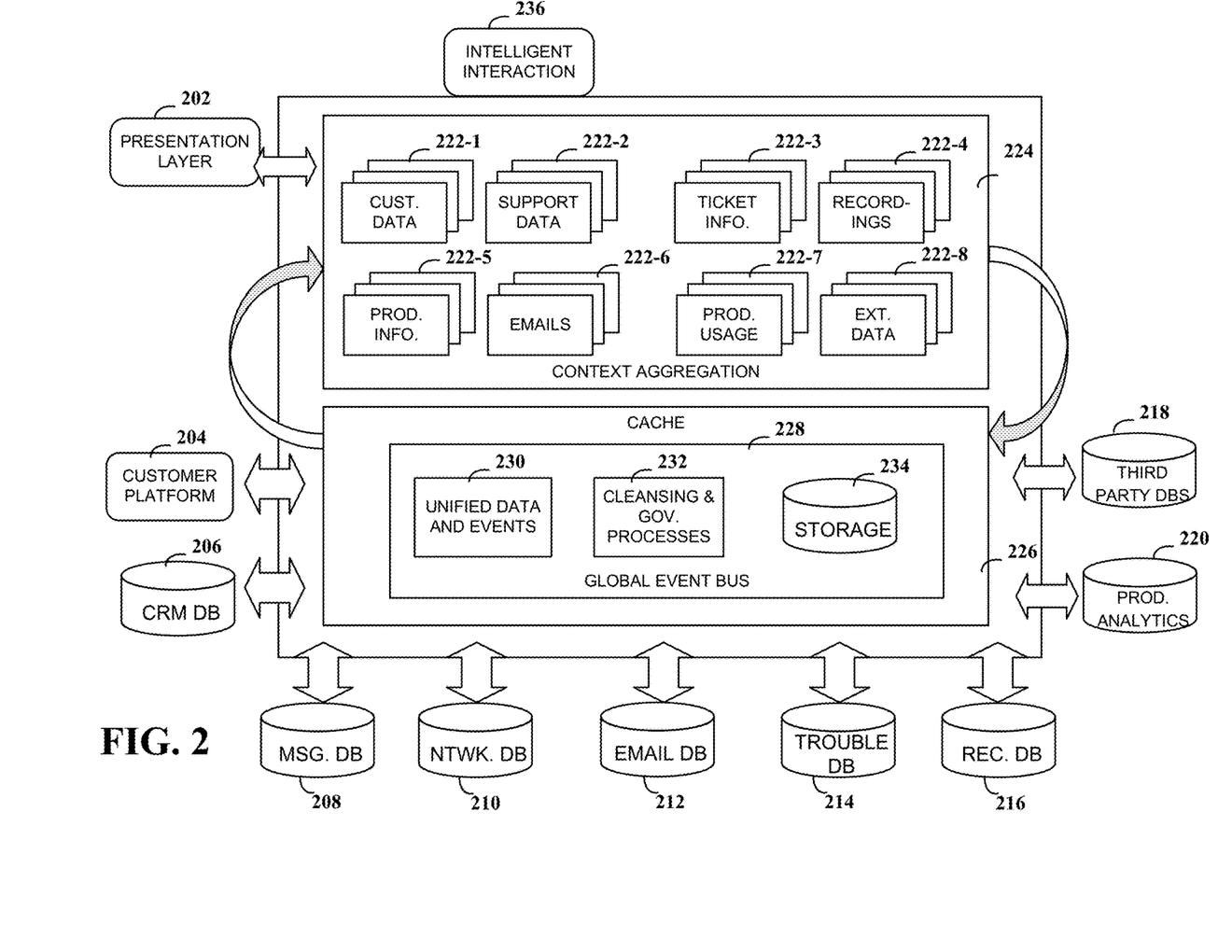
FIG. 2 illustrates a block diagram of an example an intelligent system for context aggregation, consistent with the present disclosure.

FIG. 2 illustrates a block diagram of an example system of intelligence for context aggregation, consistent with the present disclosure. The system of intelligence illustrated in FIG. 2 can be implemented by a data-center communications server hosted by a communications service provider, and/or by a client managed server hosted by a client of the communications service provider.

Data and/or information from a plurality of sources may be aggregated to determine a context between a client entity and another party. As discussed with regards to FIG. 1, each client entity can be associated with a plurality of interconnected data communications systems. For instance, a client entity can be associated with a CRM system, an email communication system, a product sales system, a text-based communications system (e.g., chat), a technological support system, and/or a data monitoring system. Examples are not so limited, and each client entity can be associated with additional and/or different communications systems beyond those listed database systems and/or databases.

Data and/or information from each of the interconnected data communications systems can be aggregated to identify a context between a client entity and another party. Referring to FIG. 2, a data cache 226 can store real-time information about all interactions involving the client entity (including the other party). For instance, a global event bus 228, stored in cache 226, can identify and record each interaction and/or event involving the client entity. A unified data and events circuit 230 can store the various data and events involving the client entity, such as emails sent and received, phone calls placed and received, chat messages, etc. A cleansing and governance processes circuit 232 can process the unified data and events as appropriate based on the content of the data. For instance, different encryption and/or data handling processes may be implemented for data and events including health data and/or financial data. A storage circuit 234 can store the various events, information regarding cleansing and governance processes, and other information.

In response to an event occurrence, such as transmission or receipt of a user-data communication, the cache 226 can be updated. Particularly, the cache 226 can be updated to include an updated context based on the aggregated communications between the client entity and the other party. For instance, the cache 226 can be communicatively coupled to a plurality of databases, including a customer platform database 204, a CRM database 206, a messaging database 208, a networking or developmental operations database 210, an email database 212, a troubleshooting database 214, a recordings database 216, a product analytics and usage database 220, and third party databases 218, among others. Data and/or information pertaining to a particular user can be retrieved from each of these databases, and stored for context aggregation, such as by a context aggregation circuit 224. As an illustration, to determine a context between Client B and ABC Company, information pertaining to customer sales and billing for Client B can be retrieved from the CRM database 206, service tickets can be retrieved from troubleshooting database 214, and transcripts of voice calls can be retrieved from the recordings database 216. Similarly, to determine a context between Client C and ABC Company, information pertaining to customer sales and billing for Client C can be retrieved from the CRM database 206, service tickets can be retrieved from troubleshooting database 214, and transcripts of voice calls can be retrieved from the recordings database 216.

In various embodiments, data and/or information from each respective database can be stored in the context aggregation circuit 224. For instance, customer data 222-1 from the customer platform 204, support data 222-2 from the network database 210, message transcripts (not illustrated in FIG. 2) from the message database 208, product information 222-5 from the CRM database 206, and emails 222-6 from the email database 212 can be stored in the context aggregation circuit 224. Additionally, service ticket information 222-3 from the troubleshooting database 214, recordings and/or transcripts from the recordings database 216, product usage and analytics 222-7 from the product analytics database 220, and external data 222-8 from third party databases 218 can be stored in the context aggregation circuit 224.

Each time that an event occurs involving the client entity and the other party, the cache 226 and context aggregation circuit 224 can be updated. For instance, each time that Client B and ABC Company interact in some way, an event record is stored in the cache 226, and the context aggregation circuit 224 is updated as appropriate. In the instance that Client B purchases a new service or product, a record from the CRM database 206 would update the cache 226, which can in turn update the product information 222-5 for Client B, and in turn update the context between Client B the ABC Company, which can be stored in storage 234. In a subsequent instance, Client B contacts ABC Company by voice and speaks with a customer service representative about a negative experience she had. In this illustration, the recording database 216 can update the cache 226, which can in turn update the recordings data 222-4 for Client B. In turn, the context for Client B and ABC Company can be updated to reflect the negative call, and the updated context can be stored in storage 234.

In various example embodiments, a presentation layer 202 can present the aggregated context in various formats. For example, circuitry configured and arranged to communicate with the system of intelligence illustrated in FIG. 2 (e.g., the cache 226 and the context aggregation circuit 224) can present a graphical user interface on a desktop computing device, mobile computing device, and/or tablet, which visually presents the context between the client entity and the other party. Continuing with the above example, a graphical user interface can present to a representative of ABC Company, a timeline illustrating the context of the relationship between Client B and ABC Company over a period of time, and the events associated with each context at each time point.

In various example embodiments, an intelligent interaction circuit and/or module 236 can, in response to receipt of a subsequent user-data communication from the participating station and intended for the client station, present to the participating station a dynamic series of inquiries to address the subsequent user-data communication, based on the aggregated context information. For instance, the intelligent interaction module 236 can present the dynamic series of inquiries to the participating station as part of a virtual assistant displayed on a graphical user interface of the other participating station or a voice prompt provided to the other participating station. The dynamic series of inquiries can be initiated, terminated, and/or modified based on feedback received from the other participating station, as discussed herein, and adjusted using various artificial intelligence and/or machine learning processes discussed herein.

Figure 3:
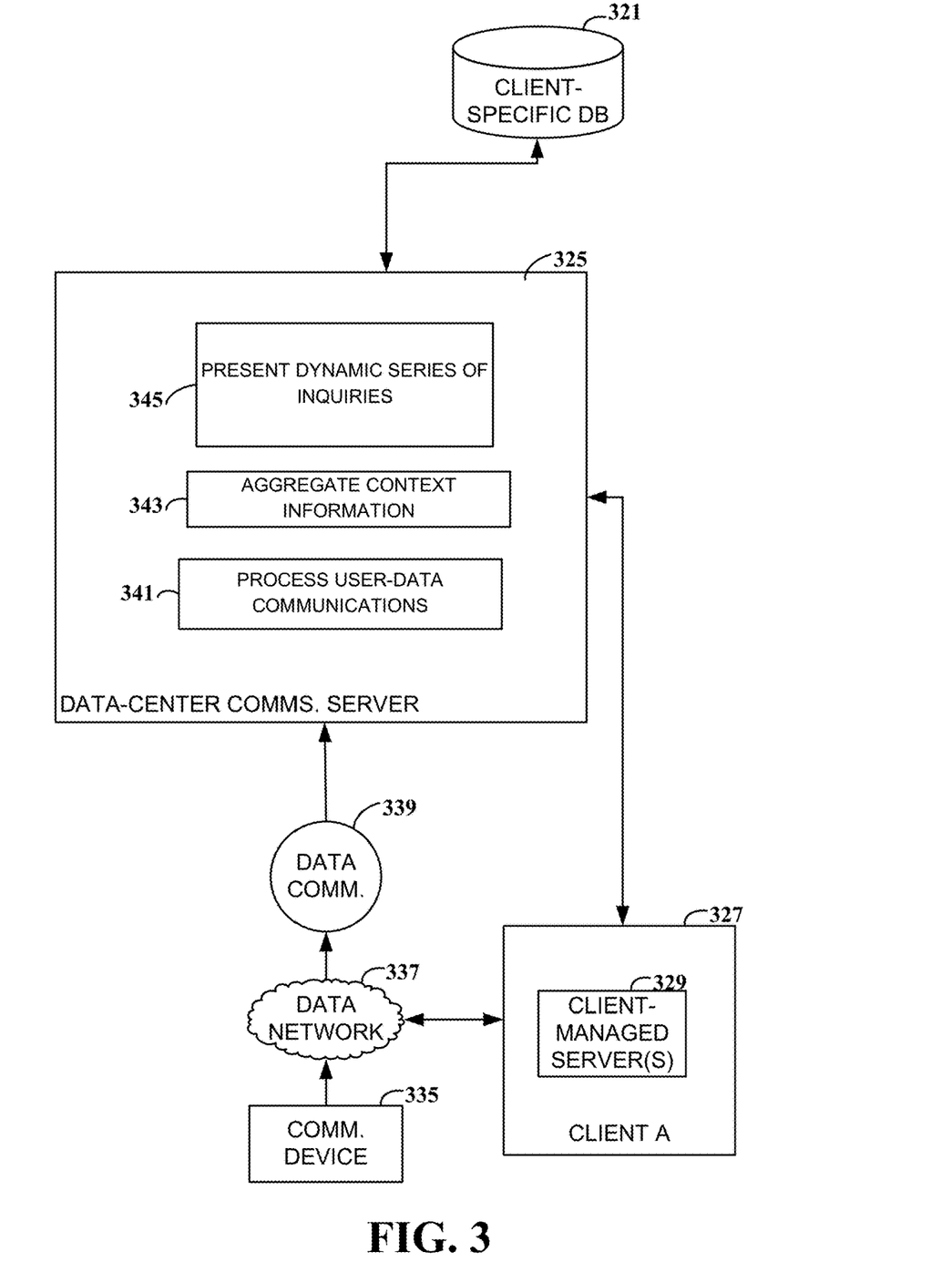
FIG. 3 illustrates a flow diagram illustrating an example method for intelligent interactions in a data communications network, consistent with embodiments of the present disclosure.

FIG. 3 illustrates a block diagram of an example system for context aggregation in a data communications network, consistent with the present disclosure. For example, a data communications device 335, such as can be used by a customer of a client entity, can send a user-data communication to a client. For instance, Client C can call ABC Company with a question about a product that he purchased. The phone call placed by Client C (e.g., the user-data communication) can originate from Client C's device 335. Communications device 335 includes circuitry configured and arranged to facilitate data communications with Client A 327, as well as a data-center communications server 325. The user-data communication (e.g., Client C's phone call) can be communicated to the client (e.g., Client A 327), via a data network 337. The data network can be communicatively coupled to a data-center communications server 325, such as can be provided by a data communications server providing data communications services on a subscription basis.

Once the customer begins recording, typing, communicating, and/or generating the data communication 339, the data-center communications server can determine a context for aggregated user-data communications involving a client entity. For instance, at 341, the data-center communications server can process user-data communications between a client station and another station participating in data communications via the data communications services, where the client station is associated with one of the client entities. Continuing with the example above, Client C can call Client A. While Client C is on the phone with Client A, additional data-communications between Client C and Client A can be retrieved. For instance, email communications between Client C and Client A, product sales information, product support information, support ticket information, product usage information, recordings from previous voice communications, and external information associated with Client C can be retrieved. While the examples provided herein discuss a data communication including a voice call, it is noted that examples are not so limited. The data communication can include non-voice messages as well. Accordingly, the user-data communication can correspond to a user-generated audible communication or a non-voice user-generated communication. As an illustration, the non-voice user-generated communication can include an email or a text message. Examples are not so limited, however, and additional and/or different types of voice and/or non-voice user-generated communications can be received from communications device 335.

As described herein, aspects of each of the plurality of user-data communications can be identified. For instance, for each user-data communication retrieved, aspects such as a keyword, a tone, a pitch, and/or a phrase can be identified. Based on the identified aspects, a context for each user-data communication can be determined. At 343 context information for each respective user-data communication between the client station and the participating station can be aggregated, where the context information corresponds to at least one communications-specific characteristic associated with the user-data communications. The context can correspond with a sentiment of the respective user-data communication. As an illustration keywords and/or phrases identified from email correspondence between Client C and Client A can be associated with a positive sentiment, indicating that Client C was happy with a recent purchase. Additionally, recordings from voicemails between Client C and Client A can include keywords and a tone indicating that Client C was happy with a customer service experience. Additional data including product usage analytics can indicate that Client C is using his purchased products extensively, and has recently purchased additional services to accompany his existing services.

The identifiable aspects of the plurality of user-data communications and/or the context from each respective user-data communication can be aggregated such that a context can be assigned to the relationship between Client C and Client A. Continuing with the above example, a context can be assigned to the relationship, indicating that the relationship is strong and positive, and Client C has had an overall positive experience with Client A. In some example embodiments, the context can be represented by a number, for instance ranging from 1 to 10 where 1 indicates that the relationship between Client C and Client A is in poor health, and 10 indicates that the relationship between Client C and Client A is in good health. As another illustration, the context can be represented by a color. For instance, the color red can indicate that the relationship between Client C and Client A is in poor health, the color brown can indicate that the relationship between Client C and Client A is in slightly poor health, the color orange can indicate that the relationship between Client C and Client A is in acceptable health, the color yellow can indicate that the relationship between Client C and Client A is in slightly good health and the color green can indicate that the relationship between Client C and Client A is in good health.

In various embodiments, context for the plurality of user-data communications (e.g., the aggregated user-data communications) can be determined, such as based on a comparison of the aggregated identifiable aspects and context information stored in a client-specific database 321. The data-center communications server 325 can serve a number of different client entities, and each respective client entity can specify different conditions under which a particular context would be assigned to a particular relationship. For instance, Client A 327 can be located in one country where a particular set of keywords are considered defamatory, whereas Client B (not illustrated in FIG. 3) can be located in a different country where the same set of keywords are not considered defamatory. Accordingly, a different set of conditions to associate particular contexts to user-data communications can be used by different client entities, and the associations between different identifiable aspects and contexts can be stored in a client-specific database such as database 321. As such, the data-center communications server 325 can be configured and arranged to provide to each respective client entity, an option to specify a plurality of identifiable aspects that can be identified from user-data communications, and at least one context associated each of the plurality of identifiable aspects.

At 345, the data-center communications server 325 can, in response to receipt of a subsequent user-data communication from the participating station (e.g., communications device 335) and intended for the client station (e.g., Client A 327), present to the participating station a dynamic series of inquiries to address the subsequent user-data communication, based on the aggregated context information.

In various example embodiments, the data-center communications server 325 can handle user-data communications between the client entity and the other party in response to the context for the plurality of user-data communications meeting predefined client-specific criteria. For instance, as each client entity can specify various associations between different identifiable aspects and contexts, each client entity can specify handling processes to be implemented when the context between the client entity and the other party meets a particular threshold and/or particular criteria. Such handling processes can also be stored in the client-specific database 321, and can be implemented by client-specific control engine(s) 323. As such, the data-center communications server 325 can be configured and arranged to provide to each respective client entity, an option to specify a plurality of handling processes for handling user-data communications between the client entity and the other party in response to the context for the plurality of user-data communications meeting predefined client-specific criteria.

Figure 4:
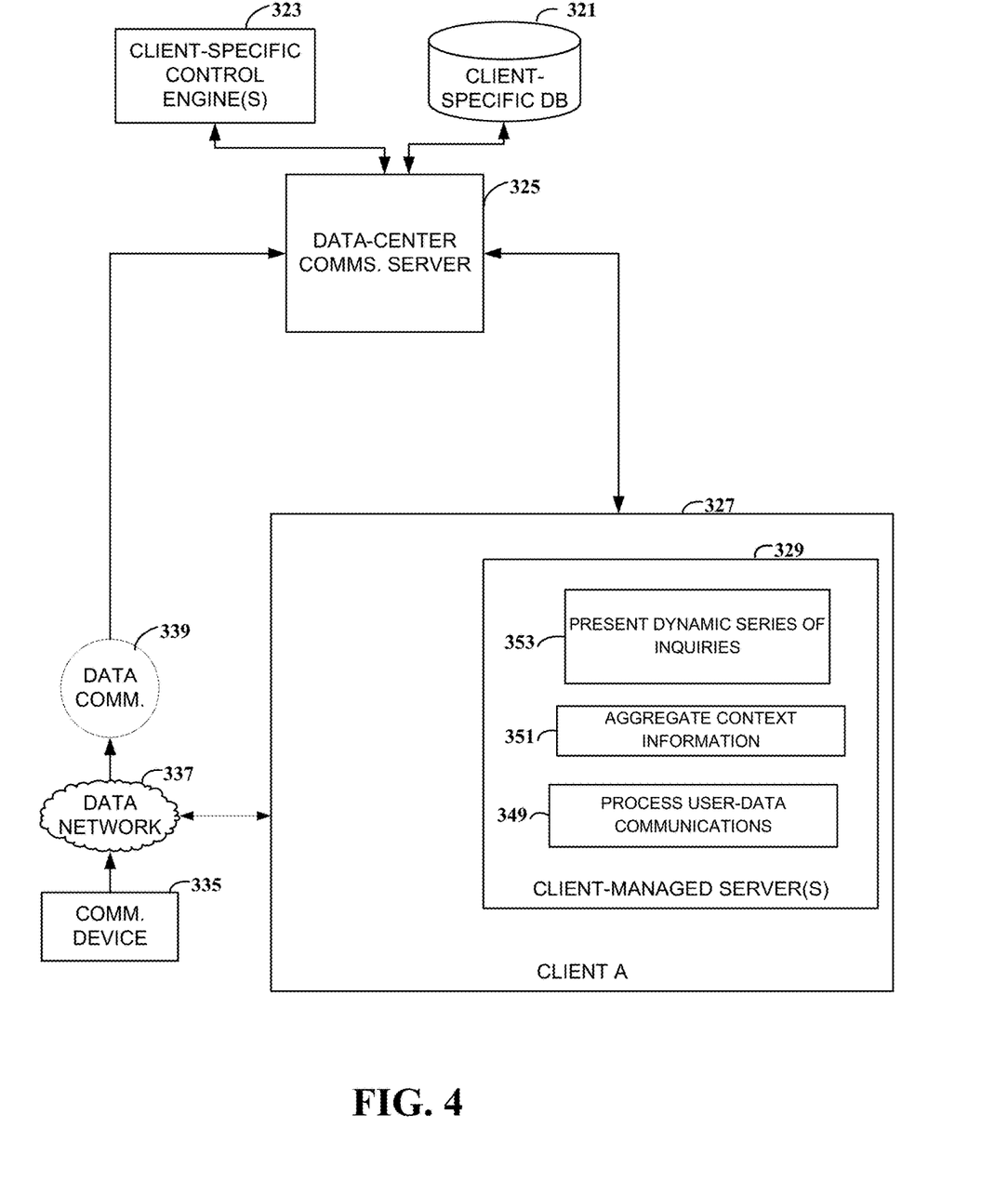
FIG. 4 illustrates an additional flow diagram exemplifying a method for intelligent interactions in a data communications network, consistent with embodiments of the present disclosure.

FIG. 4 illustrates an additional flow diagram illustrating an example method for context aggregation in a data communications network, consistent with embodiments of the present disclosure. For example, a data communications device 335, such as can be used by a customer of a client entity, can send a user-data communication to a client. For instance, Client C can call ABC Company with a question about a product that he purchased. The phone call placed by Client C (e.g., the user-data communication) can originate from Client C's device 335 (e.g., the client station). Communications device 335 includes circuitry configured and arranged to facilitate data communications with Client A 327, as well as a data-center communications server 325. The user-data communication (e.g., Client C's phone call) can be communicated to the client (e.g., Client A 327), via a data network 337. The data network can be communicatively coupled to a data-center communications server 325, such as can be provided by a data communications server providing data communications services on a subscription basis.

Once the customer (e.g., Client C) begins recording, typing, communicating, and/or generating the data communication 339, the client-managed server 329 can determine a context for aggregated user-data communications involving a client entity. For instance, at 349, the client-managed server 329 can retrieve from a plurality of interconnected data communications systems, a plurality of user-data communications between the client entity and another party. Continuing with the example above, Client C can call Client A. While Client C is on the phone with Client A, additional data-communications between Client C and Client A can be retrieved via client-managed server 329. For instance, support tickets associated with Client C, recordings of phone calls from Client C, emails from Client C, and/or external information associated with Client C can be retrieved.

As described herein, aspects of each of the plurality of user-data communications can be identified. For instance, for each user-data communication retrieved, aspects such as a keyword, a tone, a pitch, and/or a phrase can be identified. Based on the identified aspects, a context for each user-data communication can be determined. The context can correspond with a sentiment of the respective user-data communication. As an illustration keywords and/or phrases identified from email correspondence between Client C and Client A can be associated with a positive sentiment, indicating that Client C was happy with a recent purchase. Additionally, recordings from voicemails between Client C and Client A can include keywords and a tone indicating that Client C was happy with a customer service experience. Additional data including product usage analytics can indicate that Client C is using his purchased products extensively, and has recently purchased additional services to accompany his existing services.

The identifiable aspects of the plurality of user-data communications and/or the context from each respective user-data communication can be aggregated at 351 such that a context can be assigned to the relationship between Client C and Client A. Continuing with the above example, a context can be assigned to the relationship, indicating that the relationship is strong and positive, and Client C has had an overall positive experience with Client A. In some example embodiments, the context can be represented by a number, for instance ranging from 1 to 10 where 1 indicates that the relationship between Client C and Client A is in poor health, and 10 indicates that the relationship between Client C and Client A is in good health. As another illustration, the context can be represented by a color. For instance, the color red can indicate that the relationship between Client C and Client A is in poor health, the color brown can indicate that the relationship between Client C and Client A is in slightly poor health, the color orange can indicate that the relationship between Client C and Client A is in acceptable health, the color yellow can indicate that the relationship between Client C and Client A is in slightly good health and the color green can indicate that the relationship between Client C and Client A is in good health.

In various embodiments, at 353 and in response to receipt of a subsequent user-data communication from the participating station and intended for the client station, the data-center communications server 325 can present to the participating station (e.g., via the client-managed server 329) a dynamic series of inquiries to address the subsequent user-data communication, based on the aggregated context information. The data-center communications server 325 can serve a number of different client entities, and each respective client entity can specify different conditions under which a particular context would be assigned to a particular relationship, as discussed with regards to FIG. 3.

Figure 5:
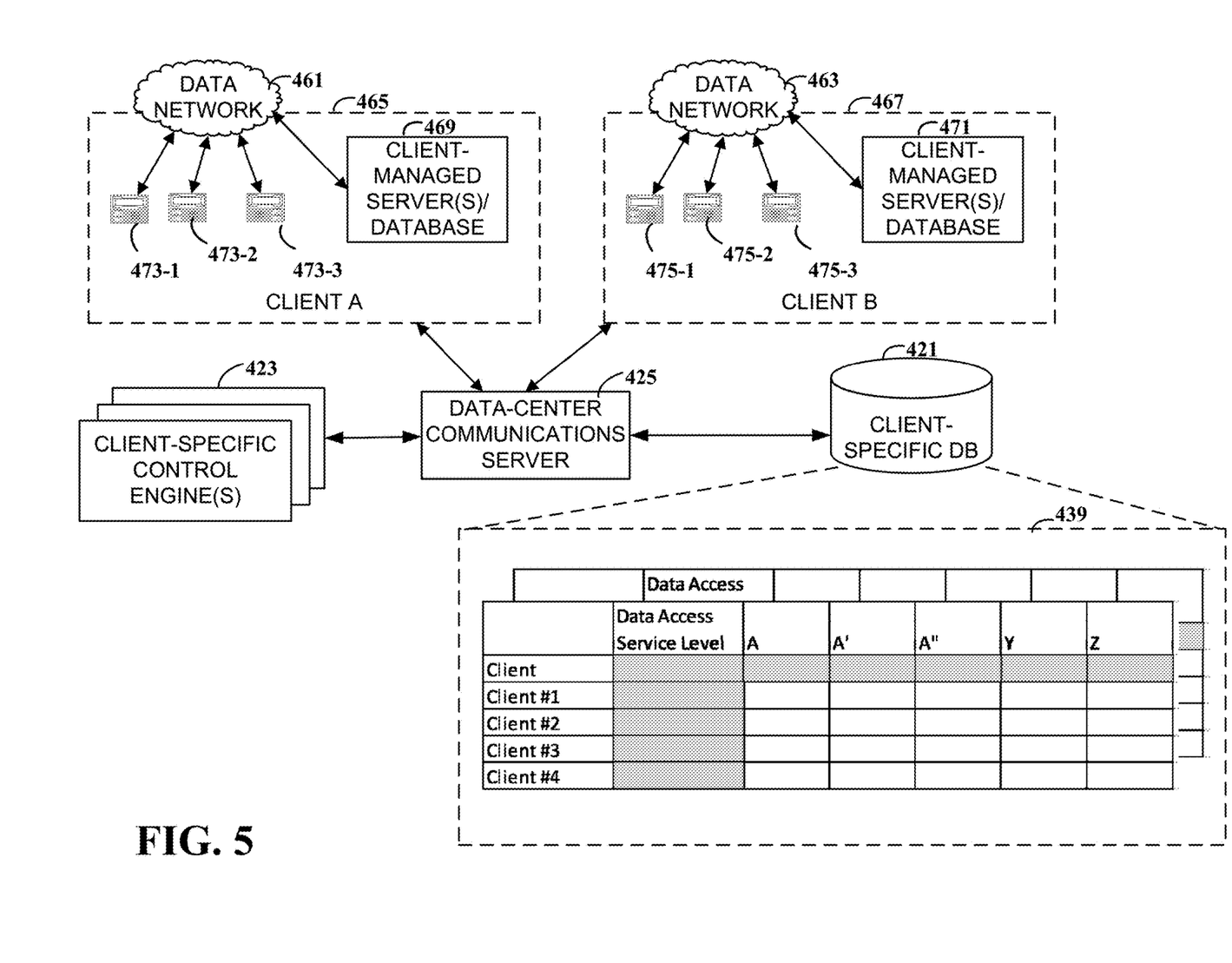
FIG. 5 illustrates a block diagram of an example data communications system for intelligent interactions, consistent with the present disclosure.

FIG. 5 illustrates a block diagram of an example data communications system for client-specific data communications monitoring, consistent with the present disclosure. The system includes a data-center communications server 425 configured to provide data communications for a plurality of endpoint devices 473-1, 473-2, 473-3, 475-1, 475-2, 475-3 connected in one or more data networks 461 and 463. The endpoint devices can include data communications-enabled devices (e.g., IP phones, smart phones, tablets, and/or desktop computers with appropriate data communications software applications) and/or non-data communications endpoint devices (e.g., plain old telephone service (POTS) telephones and cellular-capable devices). Each endpoint device is respectively associated with an account of a respective client. Endpoint devices can be associated with a particular client account by registering the endpoint device with a particular client account serviced by the data communications server. Registered devices for each client account can be listed in a respective account settings file (not shown) stored by the data-center communications server 425. In this example, endpoint devices 473-1, 473-2, and 473-3 are associated with an account 465 for a first Client A and endpoint devices 475-1, 475-2, and 475-3 are associated with an account 467 for a second client B.

The system includes one or more processing circuits configured to implement client-specific control engines 423, which are configured to adjust the data communications provided for each client account according to a respective set of control directives. For instance, the client-specific control engines 423 can adjust a manner in which endpoint devices 473-1, 473-2, 473-3, 475-1, 475-2, and 475-3 are controlled, and/or a manner of routing of a data communications for a client account, by generating client-specific sets of control data to the data-center communications server 425. For example, the client-specific control engines 423 can generate client-specific sets of control data by processing the respective set of control directives for the account in response to communication event data or other data prompts received from the data-center communications server 425.

As previously described, client-specific control engines 423 can be used to facilitate control of endpoint devices associated with a client device. The control of the endpoint devices can be associated with a variety of virtual office features including, for example, data communications services such as VoIP calls, audio and/or video conferencing, PBX exchange servers, packet switching, and traffic management as well as non-data communications services including, but not limited to, website hosting, remote data storage, remote computing services, virtual computing environments. One or more of such virtual office features can be provided, for example, by a cloud computing network having one or more servers configurable to provide a data communications system for a plurality of clients.

Each respective client entity can have a client-managed server and/or database. For instance, Client A 465 can be associated with a client managed server or database 469, whereas Client B 467 can be associated with a client managed server or database 471. The client-managed server can facilitate the routing of data communications between the respective endpoint devices and the data-center communications server. Similarly, the client-managed servers can, in some example embodiments, analyze the sentiment and criticality of communications sent to and/or received by the respective endpoint devices, as discussed herein. In some example embodiments, each respective client entity can have a database storing client-specific preferences correlating different sentiment scores and criticality scores with different handling processes.

Additionally and/or alternatively, the data-center communications server 425 can be communicatively coupled with a client specific database 421, storing service level subscriptions 439 for each of a plurality of client entities. For example, the data communications service provider can provide a plurality of different service levels for the clients. Each disparate service level can provide additional services and/or information to the client entity, relative to past communications handled and subsequent communications to be handled by the service provider. For example, Client A 465 and Client B 467 can be associated with a home improvement store and an adhesives manufacturer, respectively. Service level A, which can be offered to both Client A and Client B, can be associated with routing communications for Client A and Client B, and also providing information to the clients regarding customer purchase data. The purchase data can include information about how many products were purchased, when they were purchased, which products were associated with problems and/or an increased number of customer complaints, and the like. Similarly, a second service level (e.g., service level A') can include the services of the first service level (e.g., service level A) but also information on venue and regional demographics. For instance, Service level A', which can be offered to both Client A and Client B, can be associated with routing communications for Client A and Client B, providing information to the clients regarding customer purchase data, and providing information about demographic populations that are purchasing their products, demographic information about customer complaints, and demographic information about other customer service issues. A third service level (e.g., service level A") can include the services of service level A' but also information on venue and relative pricing grouping. For instance, service level A", which can be offered to both Client A and Client B, can be associated with routing communications for Client A and Client B, providing information to the clients regarding customer purchase data, providing information about demographic populations, and information regarding relative prices which each demographic population is willing to spend. Additional service levels (e.g., service level Y and service level Z illustrated in FIG. 2) can be specified. Each respective client entity (e.g., client #1 through client #4) can have a specified level of data service access provided by the data-center communications server 425.

Various blocks, modules or other circuits can be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, station, controller, and the like. In these contexts, a "block" (also sometimes "logic circuitry" or "module") is a circuit that carries out one or more of these or related operations/activities (e.g., a communication control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, various other circuit-related terminology is used in a similar context as apparent to the skilled artisan, as is the case with each such apparatus which refers to or includes otherwise known circuit-based structures. As a first example, a (data communications) endpoint device (or endpoint) refers to or includes a communications circuit such as one enabled to communicate over a broadband network such as the Internet or a cellular communications network (e.g., computer) processing circuits as configured to establish data communications sessions with other endpoint devices and such endpoints include, e.g., personal computers, IP-enabled mobile phones, and tablet computers. Also, a client entity (aka "client station") refers to or includes an endpoint device (as above) which is linked/associated with a client of a provider/operator of the company overseeing the data-communications server or data-center communications server. Further, a data-center communications server or data-communications server refers to or includes a computer processing circuit that is configured to provide data-communications services to other circuit-based devices. In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes). Activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:
1. A communications system comprising:
a management circuit to correlate communications-specific characteristics of user-data communications involving at least one client entity among a plurality of remotely-situated client entities with a particular context, the user-data communications being routed over a broadband network, via respective ones of client-managed servers associated with the plurality of remotely-situated client entities; and
a data-center communications server to:
process user-data communications between a client station and another station participating in data communications via data communications services by using a respective one of the client-managed servers, where the client station and the respective one of the client-managed servers are associated with one of the client entities;

aggregate context information for each respective user-data communication between the client station and the participating station, where the context information is based on or derived from a client-specific database that has entries accessed via the respective one of the client-managed servers and that stores associations between different aspects and contexts identifiable from the user-data communications, and the context information corresponds to at least one communications-specific characteristics associated with the user-data communications;

use a machine learning algorithm, in response to receipt of a user-data communication intended to be involving the participating station and the client station, to generate a series of inquiries based on previous communications involving or associated with at least one of the client station and the participating station; and present to the participating station the series of inquiries to address the user-data communication, based on the aggregated context information.

2. The communications system of claim 1, further including a unified data and events circuit, integrated with the data-center communications server, to store data and events involving said at least one client entity.

3. The communications system of claim 2, wherein the data and events involving said at least one client entity are from among the following: emails, phone calls, and chat messages.

4. The communications system of claim 1, further including a cleansing and governance processes circuit, integrated with the data-center communications server, to process and manage data and events associated with certain communications involving said at least one client entity.

5. The communications system of claim 1, further including a cleansing and governance processes circuit, integrated with the data-center communications server, to process and manage data and events associated with certain communications involving said at least one client entity and based on subject matter or content of the certain communications.

6. The communications system of claim 5, wherein the certain communications involving said at least one client entity are from among the following: emails, phone calls, and chat messages.

7. The communications system of claim 1, wherein the data-center communications server is to present the series of inquiries to the participating station as part of a virtual assistant displayed on a graphical user interface of the other station participating.

8. The communications system of claim 7, wherein the data-center communications server is to provide to each respective client station, an option to configure the virtual assistant and specify different sets of inquiries to be presented to the participating station in response to the aggregated context information for at least one of the user-data communication and predefined client-specific criteria.

9. The communications system of claim 1, wherein the data-center communications server is to present the series of inquiries to the participating station as a voice prompt provided to the other station participating.

10. The communications system of claim 1, wherein the data-center communications server is to present the series of inquiries to the participating station as part of a virtual assistant displayed on a graphical user interface of the other station participating or a voice prompt provided to the other station participating, based on a type of the user-data communication.

11. The communications system of claim 1, wherein the data-center communications server is to identify a topic being discussed in the user-data communication and to use the machine learning algorithm to modify the series of inquiries based on at least one of the identified topic and the aggregated context information.

12. The communications system of claim 1, wherein the data-center communications server is to identify an industry associated with the user-data communication and use the machine learning algorithm to modify the series of inquiries based on at least one of the identified industry and the aggregated context information.

13. The communications system of claim 1, wherein the data-center communications server is to identify an industry associated with the participating station and modify the dynamic series of inquiries based on the identified industry and the aggregated context information.

14. The communications system of claim 1, wherein the data-center communications server is to identify a context associated with the user-data communication and route the user-data communication to a particular branch or extension of the client station based on at least one of the identified context and the aggregated context information.

15. The communications system of claim 1, wherein the management circuit is to maintain the client-specific database and the client-specific database correlates keywords or tones identified in user-data communications with at least one issue or topic of said user-data communications, and wherein the data-center communications server is to:

compare a keyword or a tone identified from the subsequent user-data communication with information stored in the client-specific database; and generate or modify the series of inquiries based on the comparison and the aggregated context information.

16. The communications system of claim 1, wherein the data-center communications server is to:

present a dynamic series of inquiries to the participating station as part of a virtual assistant; and route the subsequent user-data communication to a representative of the client entity based on the aggregated context information.

17. The communications system of claim 16, wherein the data-center communications server is to:

generate a transcript of the series of inquiries and responses provided during use of the virtual assistant; and provide the transcript to the representative in response to the routing.

18. A method for use with a communications system having a data-center communications server to provide data communications to a plurality of client entities over a broadband network, via respective ones of client-managed servers, and having a management circuit to manage data associated with the provided data communications, wherein each one of the plurality of client entities is associated with a respective one of the client-managed servers that is configured to access the data-center communications server and that is communicatively coupled to endpoint devices associated with respective ones of the plurality of client entities, the method comprising:

correlating, via the management circuit, communications-specific characteristics of user-data communications involving at least one client entity among the plurality of client entities with a particular context based on or derived from a client-specific database storing associations between different aspects and contexts identifiable from the user-data communications, wherein the user-data communications are routed via the respective one of the client-managed servers associated with said at least one client entity and the client-specific database has entries accessed via the respective one of the client-managed servers; and via the data-center communications server:

processing user-data communications between a client station and another station participating in data communications via data communications services, where the client station is associated with one of the client entities;

aggregating context information for each respective user-data communication between the client station and the participating station, where the context information corresponds to at least one communications-specific characteristic associated with the user-data communications;

using a machine learning algorithm, in response to receipt of a user-data communication intended to be involving the participating station and the client station, to generate a series of inquiries based on previous communications involving or associated with at least one of the client station and the participating station; and presenting to the participating station the series of inquiries to address the user-data communication, based on the aggregated context information.

19. The method of claim 18, further including retrieving via the data-center communications server and from a plurality of disparate interconnected data communications systems, information relating to user-data communications involving at least one of the client station and the participating station.

20. The method of claim 19, wherein each of the plurality of disparate interconnected data communications systems has provided a communications service to at least one of the client station and the participating station.

\* \* \* \* \*